United States Patent
Spinelli et al.

(10) Patent No.: US 7,724,785 B2
(45) Date of Patent: May 25, 2010

(54) MULTIPLE PULSED-LASER SYSTEM FOR SILICON CRYSTALLIZATION

(75) Inventors: Luis A. Spinelli, Sunnyvale, CA (US); Sergei V. Govorkov, Los Altos, CA (US)

(73) Assignee: Coherent, Inc., Santa Clara, CA (US)

( * ) Notice: Subject to any disclaimer, the term of this patent is extended or adjusted under 35 U.S.C. 154(b) by 188 days.

(21) Appl. No.: 11/824,220

(22) Filed: Jun. 29, 2007

(65) Prior Publication Data
US 2009/0003392 A1  Jan. 1, 2009

(51) Int. Cl.
*H01S 3/11* (2006.01)
*H01S 3/10* (2006.01)

(52) U.S. Cl. ............................... 372/10; 372/9; 372/11; 372/12; 372/13; 372/14; 372/15; 372/16; 372/17

(58) Field of Classification Search ................ 372/9–17
See application file for complete search history.

(56) References Cited

U.S. PATENT DOCUMENTS

| | | | | |
|---|---|---|---|---|
| 5,237,578 A | * | 8/1993 | Amano | 372/22 |
| 6,324,195 B1 | * | 11/2001 | Suzuki et al. | 372/25 |
| 6,931,035 B2 | * | 8/2005 | Wang | 372/10 |
| 2004/0057475 A1 | * | 3/2004 | Frankel et al. | 372/25 |
| 2004/0076197 A1 | * | 4/2004 | Clarkson et al. | 372/6 |
| 2006/0198402 A1 | | 9/2006 | Hodgson et al. | 732/22 |

* cited by examiner

*Primary Examiner*—Minsun Harvey
*Assistant Examiner*—Delma R Forde
(74) *Attorney, Agent, or Firm*—Morrison & Foerster LLP

(57) ABSTRACT

Multiple laser resonators share a common acousto-optic Q-switch. The Q-switch is driven by a radio-frequency (RF) transducer that causes an acoustic wave to propagate in the Q-switch. Turning off the RF transducer discontinues propagation of the acoustic wave and causes each of the laser resonators to deliver an optical pulse. The finite velocity of the acoustic wave causes the pulses to be delivered temporally spaced apart.

11 Claims, 2 Drawing Sheets

MULTIPLE PULSED-LASER SYSTEM FOR SILICON CRYSTALLIZATION

TECHNICAL FIELD OF THE INVENTION

The present invention relates in general to laser crystallization of amorphous silicon layers. The invention relates in particular to laser crystallization using the combined output of a plurality of lasers.

DISCUSSION OF BACKGROUND ART

The use of lasers for producing low temperature polycrystalline silicon (LTPS) layers on glass substrates is an important technological advance in the manufacture of flat panel displays. Existing systems commonly use a high power excimer laser in cooperation with appropriate optics to create a long and narrow line of laser radiation on a layer being crystallized. The radiation intensity in the beam line is sufficient for melting and subsequent crystal re-growth in a silicon layer, resulting in much improved electrical parameters of the film.

Excimer lasers, however, have high initial capital costs and high running costs compared with solid-state lasers. This has prompted research into possibilities of using solid-state lasers in place of excimer lasers in silicon crystallization. Q-switched frequency-doubled solid-state lasers having an output wavelength of about 532 nm have proved useful in producing LTPS films. However, scaling such a laser to the required average power levels for crystallization (greater than about 100 Watts at a minimum and preferably greater than 1 kilowatt), while preserving the high beam quality is not a simple task. This requires technical improvements in the laser design that are not readily feasible, and leads to a costly system. Presently, such lasers are commercially available with output power levels of less than 200 watts (W), more commonly about 50 W. Additionally, such lasers typically output relatively short pulses ranging from few nanoseconds (ns) to several ten nanoseconds. A desired optimal pulse duration is several hundred nanoseconds. Therefore, there is a clear need for a high-average-power, pulsed, solid-state laser source that is cost efficient, scalable to required power levels, and has a pulse duration at least significantly greater than that available from prior-art commercially available Q-switched lasers.

SUMMARY OF THE INVENTION

In one aspect, apparatus in accordance with the present invention comprises a plurality of laser resonators. A single acousto-optic Q-switch is shared by all of the laser resonators, the Q-switch and the resonators are arranged such that when the Q-switch is once-switched each the laser resonators delivers an optical pulse, with the optical pulses delivered by the resonators being temporally spaced apart.

In another aspect of the present invention the plurality of pulses is directed by beam combining optics to a common linear region in a focal plane of the beam combining optics. The pulses can be partially temporally overlapped to provide the effect of a single pulse having a duration longer than the duration of any one of the plurality of pulses.

In one embodiment of the apparatus each of the laser resonators has a dedicated gain-medium and is terminated at one end thereof by a dedicated maximally reflecting mirror. At the other end of the resonators there is a shared output mirror that terminates all of the laser resonators.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
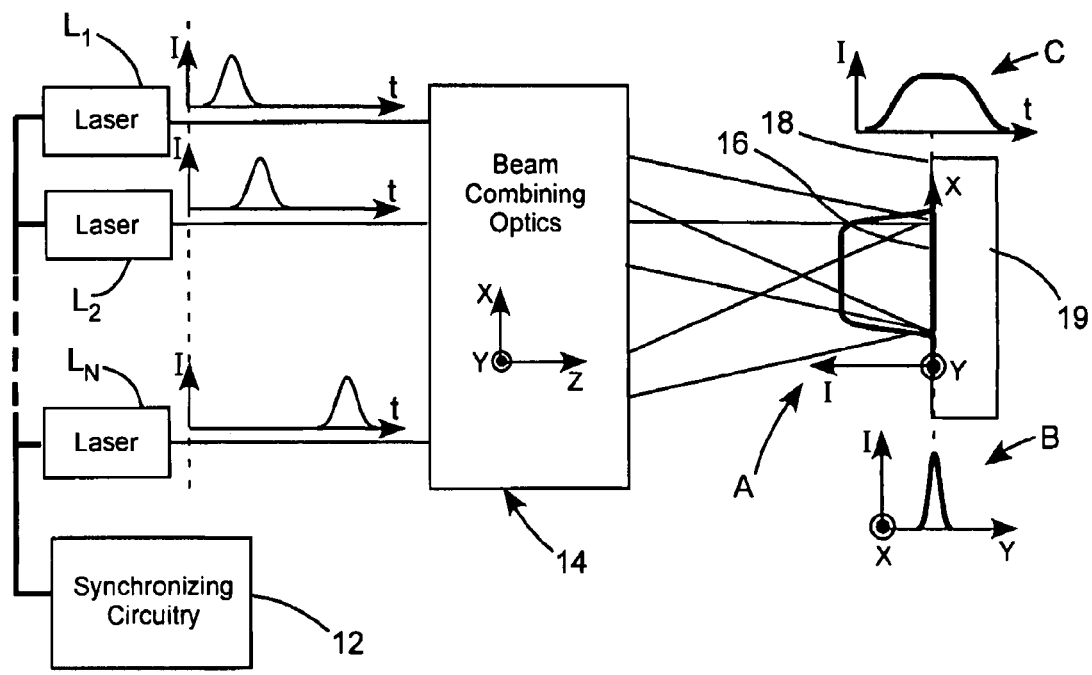
FIG. 1 is a block diagram schematically illustrating one preferred embodiment of apparatus in accordance with the present invention including a plurality of lasers each delivering a laser beam in the form of an optical pulse, beam combining optics arranged to combine the beams in a single plane in the form of a line of laser radiation, and synchronizing circuitry arranged to synchronize delivery of the pulses from the lasers such that the pulses are delivered at predetermined intervals, such that the line of light is in the form of an optical pulse having a duration longer than that of the individual pulses.

Referring now to the drawings, wherein like components are designated by like reference numerals, FIG. 1 schematically illustrates one preferred embodiment 10 of apparatus in accordance with the present invention including a plurality of lasers designated $L_1$, $L_2$, and $L_N$. It is assumed, here, that each of these lasers is Q-switched pulsed, solid-state lasers each delivering a laser beam in the form of an optical pulse. The pulses are schematically depicted, alongside each beam path, on axes of intensity (I) as a function of time (t). The pulses are designated $P_1$, $P_2$, and $P_N$ according to the particular laser from which each pulse is delivered. The pulses can be fundamental wavelength pulses of the lasers or pulses having a harmonic (frequency-converted) wavelength of the laser fundamental wavelength.

Such pulses have a pulse-duration between a few nanoseconds (ns) and tens of nanoseconds, depending, inter alia, on the gain-medium of the lasers, the specific resonator configuration, and the switching speed of the Q-switch. Pulse durations in this range are typical for lasers having a Nd:YAG, ND:YLF or Nd:YVO$_4$ gain medium. These lasers have a fundamental wavelength of about 1064 nm. Frequency converted ones of these lasers can provide a good-quality output beam having an average power at the second-harmonic wavelength (532 nm) ranging from a few watts (W) to ten or more watts. Pulses are usually delivered repetitively at a pulse-repetition frequency (PRF) ranging from about 100 Hz to 100 kHz or more, depending on process parameters required. The pulse-repetition interval will usually be at least one order of magnitude greater than the duration of an individual pulse.

Accordingly it is convenient to describe the inventive apparatus in terms of combining one individual pulse from each laser.

In apparatus 10, synchronizing circuitry 12 controls the Q-switch (not shown) of each laser so that the pulses from the plurality of different lasers are delivered at exactly the same PRF but temporally spaced apart as indicated in FIG. 1 by the intensity-versus-time graphs associated with each laser. The pulses (pulsed beams) from the lasers are delivered from the lasers to beam combining optics 14, here shown as a single functional block. The Cartesian axes of the beam combining optics within are designated on the block. The Z-axis is the propagation axis.

Beam combining optics 14 are configured and arranged such the plurality of beams forms a line of radiation 16 in a working (focal) plane 18 in which a workpiece 19 including having a layer (not shown) thereon to be crystallized is placed. The relative intensity along the length of the line of light (here, in the X-axis) is schematically indicated by graph A, and the relative intensity along the width of the line of light is schematically indicated by graph B. The near-uniform intensity distribution in the X-axis is often whimsically referred to by practitioners of the art as a "top hat" intensity-distribution or intensity profile.

Figure 3:
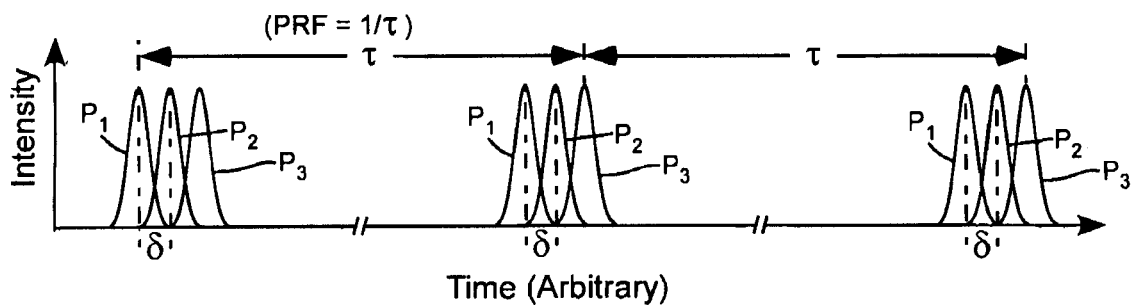
FIG. 3 is a graph schematically illustrating radiation intensity as a function of time in a line or radiation projected by an example of the apparatus of FIG. 1

The duration of line 18 is represented schematically by graph C and is a "flattened" pulse, being the temporal sum of the individual pulses, and having a duration longer than any individual pulse, with the duration and form of the temporal sum depending on the intervals between the individual pulses and the relative intensities of the pulses. Those skilled in the art will recognize that with the PRF of the lasers synchronized to be exactly equal, such temporal-sum pulses will occur at that PRF. FIG. 3 schematically illustrates groups of three individual pulses $P_1$, $P_2$, and $P_3$, of a sum, temporally spaced apart by an interval δ and delivered periodically with a repetition period τ, where τ is very much greater than δ. By way of example δ may be between about 50 ns and 100 ns. At a PRF of 100 kHz, τ is 10 milliseconds.

It is emphasized that the terminology "temporally spaced apart" as used in this description does not mean that the any one pulse is completed before the next is delivered. Rather the terminology can be interpreted as meaning that intensity peaks of the pulses are temporally spaced apart. Sequential pulses may be temporally partially overlapping. Indeed, some partial temporal overlap would be required to provide a temporal sum of the pulses that was at least partially temporally uniform in intensity.

In a crystallizing process the line would be scanned in a direction perpendicular to the length of the line over a layer being crystallized. This is preferably accomplished by moving the layer with respect to the line by transport arrangements well known in the art. In FIG. 1, workpiece 19 would be scanned perpendicular to the plane of the drawing.

By way of example, in recrystallization of amorphous silicon films on glass substrates for flat panel displays, a fluence-per-pulse of about 1 Joule per centimeter squared ($J/cm^2$) is preferred. Accordingly, in an example wherein the plurality of lasers delivers about 500 W at a PRF of 10 kHz, the length of line 16 could be 500 mm. This length is sufficient for the current generation of panels. The line width (the $1/e^2$ width of graph B) would preferably be about 10 micrometers (μm), and the scan rate would be about 5 centimeters per second (cm/sec) in a so-called "2-shot" sequential lateral solidification (SLS) process. Thus, the ability to form a narrow line of radiation is required, which requires high beam-quality from each laser.

Several examples of beam combining optics for forming a line of radiation are known in the art. One feature of such optics is an ability to form a line of radiation that has an about uniform intensity, for example uniform within about 5%, along the long axis of the line, the X-axis in the apparatus of FIG. 1. Another feature of such optics is an ability to form a line of radiation that is narrow in the width-axis (Y-axis) of the line, for example having a width close to the diffraction limit of few micrometers to tens of micrometers, depending on the wavelength of the radiation. Preferably each of the beams being combined contributes to the entire length of the line of radiation.

Figure 2A:
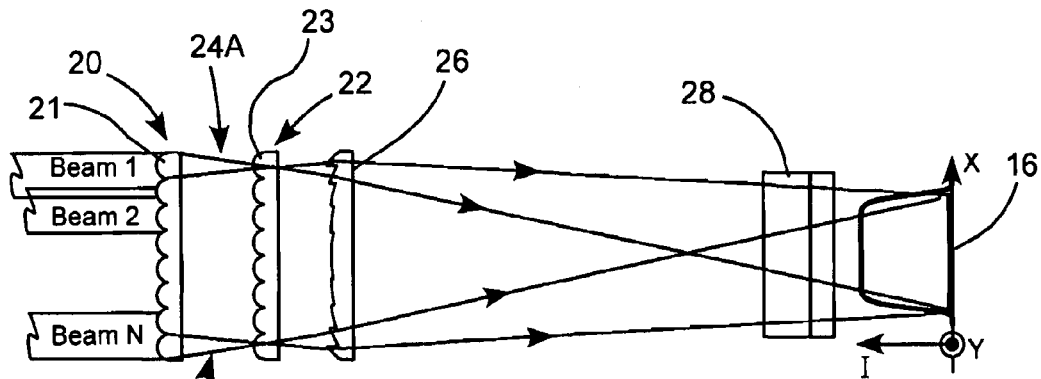
FIGS. 2A and 2B schematically illustrate one example of beam combining optics suitable for the apparatus of FIG. 1.
Figure 2B:
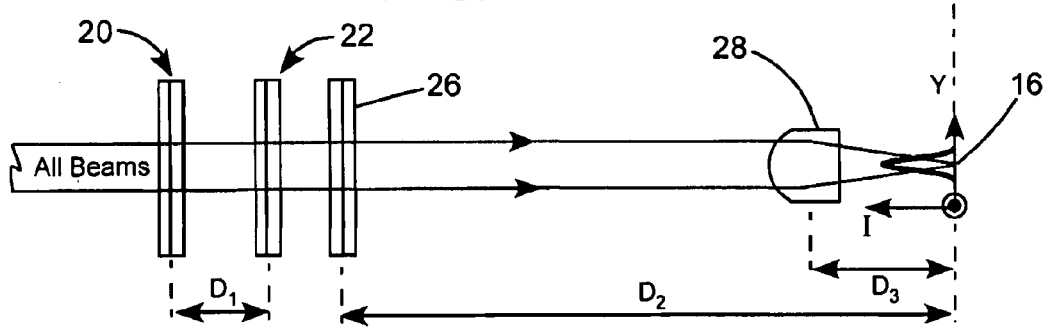

FIGS. 2A and 2B schematically illustrate one particular example of such beam forming optics. FIG. 2A is a view in the X-Z plane of apparatus 10 and FIG. 2B is a view in the Y-Z plane of apparatus 10. Beam combining optics includes arrays 20 and 22 of cylindrical lenses 21 and 23 respectively. The arrays are spaced apart and parallel to each other with the lenses in each parallel to each other. The lenses have (positive) optical power in the X-axis and zero power in the Y-axis. Cylindrical lens array 20 divides beams incident thereon into a plurality of smaller beams. Only three incident beams (beam 1, beam 2 and beam N) and only two smaller beams 24A and 24B are shown in FIG. 2A for simplicity of illustration. Each of the smaller beams is focused into array 22. The lens arrays are cooperative with a cylindrical lens 26 which also has positive optical power in the X-axis and zero power in the Y-axis. Here, cylindrical lens 26 is a Fresnel lens for compactness. An additional cylindrical lens 28 having zero optical power in the X-axis and positive optical power in the Y-axis is spaced apart from lens 26.

Arrays 20 and 22 and lens 26 act in the X-axis as what is often referred to by practitioners of the art as a "fly's eye" beam-homogenizer and form a top hat intensity profile in the X-axis in plane 18. The focal length of the lenses in array 20 is about equal to distance $D_1$ in FIG. 2B, and about equal to the focal length of the lenses in array 22. Distance $D_2$ is about equal to the focal length of the lens 26. The magnification of the optics is equal to the focal length of lens 26 divided by the focal length of the lenses in the arrays and is selected to form a required line-length in plane 18 work piece. This length is the width of the lenses in the arrays times the magnification. In the Y-axis axis (critical axis), the combination of lens arrays 20 and 22 with lens 26 does not introduce any optical power. Focusing of the combined beams to a narrow width of line 16 in plane 18 line is effected cylindrical lens 28. Accordingly, the distance $D_3$ should be about equal to the focal length of lens 28.

It should be noted that that the incoming laser beams can be partially overlapped (as illustrated in FIG. 2A), or completely overlapped at lens array 20. Each beam is effectively diced by lenses of array 20 in the multiple smaller beams (segments) with varying intensity profiles. The imaging of each of the smaller beams by array 22 and lens 26 into plane 18 results in an overlap of multiple beams and, therefore, averages of the intensity variations along the X-axis. It is clear from the illustration of FIG. 2A that each point of the line 16 in plane 18 receives contributions from each laser in the apparatus. Accordingly, temporal fluctuations of beam intensity are also averaged. Additionally, if the lasers are triggered so as to output temporally spaced-apart pulses, the resulting temporal profile at each point in line 16 is a longer pulse than any individual pulse as a result of adding the temporally spaced apart pulses.

It should be noted that solid-state lasers have sufficiently high coherence that the interference patterns can be formed in plane 18 by contributions from the same beam but different lenses in array 20. However, as line 16 includes contributions from all beams and these beams come from different lasers that are not mutually coherent these interference patterns are smoothed due to averaging, minimizing the effect of interference effects on uniformity of illumination. This provides that the pulses can be temporally overlapped to provide a nearly uniform (or any other desired) temporal intensity distribution. Further, deterioration of any one laser due to wear or failure does not impact the uniformity substantially, since each laser contributes only a fraction of the overall intensity profile in line 16.

It is emphasized here that beam-combining optics illustrated in FIG. 2 is only one example of beam combining optics that can provide a similar result. Other arrangements may be used without departing from the spirit and scope of the present invention. Alternative arrangements include, but are not limited to, using one spherical lens instead of the two separate cylindrical lenses 26 and 28, and using a diffractive optical homogenizer in place of the parallel lens arrays.

Figure 4:
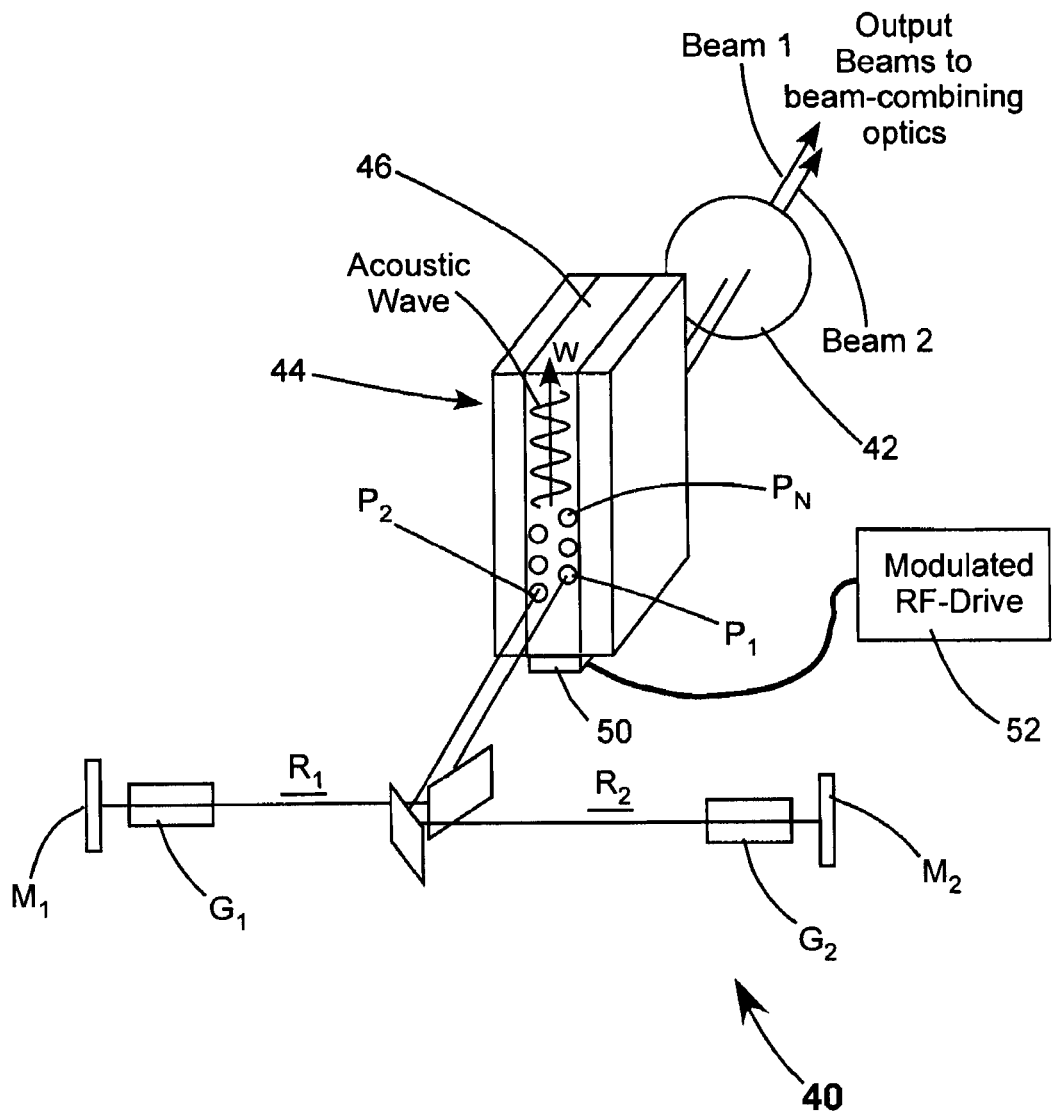
FIG. 4 schematically illustrates one arrangement in accordance with the present invention for synchronizing the plurality of lasers, wherein resonators of each of the lasers have a corresponding maximally reflective mirror and a corresponding gain-medium, but wherein the lasers share a common output-coupling mirror and a common acousto-optic Q-switch, with the axes of the resonators spaced apart on the Q-switch such that spacing of the axes and the speed of travel of an acoustic wave in the Q-switch determines the interval between the pulses.

In apparatus 10 of FIG. 1, synchronizing circuitry is required to control individual Q-switches of the lasers such that the lasers all operate at exactly the same PRF and such that, within any pulse-repetition period, individual pulses from the lasers are temporally spaced apart. FIG. 4 schematically illustrates a novel multiple-output laser arrangement 40 wherein such synchronizing circuitry is not required.

Here, multiple-output laser 40 includes a plurality of laser resonators, only two, $R_1$ and $R_2$, of which are depicted in FIG. 4, for simplicity of illustration. Each resonator is terminated by a dedicated, maximally-reflective (at the laser wavelength) mirror, as exemplified by mirrors M1 and M2 of resonators R1 and R2 respectively, and a common mirror 42. Mirror 42 is partially transmissive at the laser wavelength and serves as an output mirror for each of the plurality of laser resonators. There are of course as many output beams as there are laser resonators. The laser resonators also share a single acousto-optic (AO) Q-switch 44.

Q-switch 44 includes a block 46 of optically transparent acousto-optic material preferably having a relatively large elasto-optical (also known as photo-elastic) coefficient. One preferred such material is fused silica having an elasto-optical coefficient of 0.121. A radio frequency (RF) transducer 50, when RF driven, creates a traveling acoustic wave indicated whimsically by a sine-wave. The acoustic wave propagates in a direction indicated by arrow W, in the AO material. This can provide an active region (not explicitly shown) that can be as wide as several millimeters and as long (in the W direction) as several centimeters. The transducer 50 is driven by an RF power supply 52 that can be modulated at a rate corresponding to a desired PRF.

Beams traversing the active region suffer diffraction, provided that they are aligned at the Bragg angle to the equal phase planes of the acoustic wave. This diffraction introduces the loss mechanism necessary in each of the resonators for Q-switching. As long as the acoustic wave is propagating, the loss prevents laser action in the resonator. When the Q-switch is operated by switching off the RF drive to the transducer, the loss in the resonators is removed, and laser action in each resonator occurs in the form of a pulse that is output from mirror 42.

Since the acoustic-wave has a finite velocity in the AO-material, resonators at different distances from the RF-transducer 50 will experience switching at different times, with the resonator having the longitudinal axis thereof closest to the transducer switching first, and others switching with a delay proportional to the distance of the resonator axes from the transducer in the W direction. In FIG. 4, the resonator axis (beam) positions on the AO-material are designated by small circles $P_1, P_2 \ldots P_N$. Output beams can be combined in beam-combining optics as discussed above.

By way of example, in fused silica, the velocity of sound is about 6 millimeters per microsecond (mm/μsec), i.e., about 6,000 meters per second (6,000 m/sec). This means that for a practical beam aperture size of 1 mm, in apparatus 40, at least 6 laser resonators can be fit into a 500 ns delay "window", i.e., with a pulse-output delay between adjacent resonators of about 83 ns. In order to accommodate the relatively tight resonator spacing, the beam locations on the AO-material are preferably arranged in a zigzag pattern as depicted in FIG. 3. Tight resonator spacing is accomplished by using staggered fold-mirrors in the resonators as exemplified by mirrors 50 and 52. Arrangements for tightly grouping laser beams using fold mirrors on precision alignment mounts is described in detail in U.S. patent application Ser. No. 11/488,578, filed Jul. 18, 2006, assigned to the assignee of the present invention and the complete disclosure of which is hereby incorporated by reference.

In apparatus 40, the PRF at which the groups of sequentially delayed pulses are delivered is determined by modulating the RF drive to the transducer at that PRF so all of the resonators will have the same PRF without the need for separate electronic synchronization. The delay between pulses in any group is determined by the spacing of beam positions (in the acoustic wave propagation-direction) on the AO-material, as described.

In a case where the amount of resonators in a group is less than a desired total it is of course possible to have a plurality of apparatuses such as apparatus 40 in place of the plurality of individual lasers in apparatus 10 of FIG. 1. This would, however require the use of synchronization circuitry to synchronize the PRF of the groups and delivery delay of pulses. Any effects of temporal jitter, both within and between the groups, are negated by averaging over large number of laser-resonators.

It should be noted that while the axes of the resonators in apparatus 40 are indicated as being parallel to each other, this should not be construed as limiting the invention. The beams of the resonators do not have to be parallel to each other in the AO-material of the Q-switch. By introducing a small angle between the beams (resonator axes), but keeping the Bragg condition, it is possible to fit more beams into the maximum delay-window of the Q-switch by allowing the beams (axes) to overlap (intersect) spatially somewhere in the active region of the AO-material.

It should also be noted that while apparatus 40 is described in terms of resonators that deliver radiation at the fundamental wavelength of the resonators, those skilled in the art will recognize, without further illustration or detailed description, that principles of the apparatus can be applied to shared-Q-switch resonators, the output of which is frequency-converted in an optically nonlinear crystal. This optically nonlinear crystal could be a common optically nonlinear crystal located in the output beam paths outside of the resonators and arranged for frequency-doubling the output beams. Shared Q-switch arrangements in accordance with the present invention are also possible in which resonators thereof are intracavity frequency-converted.

In summary present invention is described above in terms of a preferred and other embodiments. The invention is not limited, however, to the embodiments described and depicted. Rather, the invention is limited only by the claims appended hereto.

What is claimed is:

1. Optical apparatus, comprising:
a plurality of laser resonators and a single, common acousto-optic Q-switch, the Q-switch being located in and shared by all of said laser resonators, the Q-switch and the resonators being arranged such that when the Q-switch is once-switched, each of the laser resonators delivers an optical pulse, with the optical pulses delivered by the resonators being temporally spaced apart.

2. The apparatus of claim 1, wherein the Q-switch can be periodically operated such the plurality of resonators repeatedly deliver a corresponding plurality of the temporally spaced-apart pulses.

3. The apparatus of claim 1, wherein the temporal spacing of the pulses is such that there is some partial temporal overlap between any two pulses.

4. The apparatus of claim 1, wherein each of the plurality of resonators is terminated by a dedicated one of a corresponding plurality of mirrors and a mirror common to all resonators.

5. The apparatus of claim 4, wherein the dedicated mirror of each resonator is maximally reflective for the wavelength of the optical pulses and the common mirror is partially transparent at the wavelength of the optical pulses and serves as an output mirror for each of the resonators.

6. The apparatus of claim 1, further including beam combining optics arranged to direct the optical pulses to a common location in a focal plane thereof.

7. A laser system comprising:
a plurality of lasers, each laser having a gain medium located within a resonator;
a Q-switch having an extended region of acousto-optic material, said Q-switch being activated in response to the activation of a transducer positioned at one end of said extended region, and wherein the Q-switch is positioned such that the resonator axis of each of the lasers crosses the acousto-optic material at different locations spaced along said extended region; and
a driver for supplying an activation signal to said transducer to generate a series of Q-switched pulses from each of said lasers, said pulses being temporally spaced as a function of the position at which the resonator axis of each laser crosses the acousto-optic material of the Q-switch.

8. A laser system as recited in claim 7, wherein each of the resonators of the lasers share a common output coupling mirror.

9. A laser system as recited in claim 7, wherein said driver supplies a series of activation signals to generate a series of Q-switched output pulses from each laser.

10. A laser system as recited in claim 7, wherein the position at which the resonator axis of each of the lasers crosses the acousto-optic material is selected so that the Q-switched pulses derived from adjacent resonator axes partially temporally overlap.

11. A laser system as recited in claim 7, further comprising beam combining optics arranged to direct the Q-switched pulses to a common location in a focal plane thereof.

* * * * *